Nov. 17, 1964   W. G. SHEQUEN   3,157,801
COOLING MEANS FOR THERMOSTATS
Filed March 7, 1960   2 Sheets-Sheet 1

INVENTOR.
WINSTON G. SHEQUEN
BY Lyon & Lyon
ATTORNEYS

Nov. 17, 1964   W. G. SHEQUEN   3,157,801
COOLING MEANS FOR THERMOSTATS
Filed March 7, 1960   2 Sheets-Sheet 2

INVENTOR.
WINSTON G. SHEQUEN
BY
Lyon & Lyon
ATTORNEYS

United States Patent Office 3,157,801
Patented Nov. 17, 1964

3,157,801
COOLING MEANS FOR THERMOSTATS
Winston G. Shequen, La Crescenta, Calif., assignor to International Telephone and Telegraph Corporation, Baltimore, Md., a corporation of Maryland
Filed Mar. 7, 1960, Ser. No. 13,184
2 Claims. (Cl. 307—117)

The present invention relates to cooling means associated with thermostats so as to render the thermostat more accurate in its intended purpose of regulating or controlling apparatus which in turn affects the temperature sensed by the thermostat.

Briefly this involves the provision of a cold source in the form of a cold junction responsive to current passage either for generally counteracting the heat developed in the thermostat switch contacts to render the thermostat insensitive to such undesirable heat or for providing an anticipatory effect on the thermostat (an opposite effect than that provided by the usual heat anticipator) or for a combination of such purposes.

The cold source in the form of a cold junction as disclosed herein involves the use of semi-conducting materials arranged to accomplish the so-called Peltier effect. The cold junction itself comprises a slab of copper or other similar material having suitably affixed thereto on one end thereof lead telluride (an N-type material) and on the other end thereof antimony telluride (a P-type material). There is a heat sink associated with each of said materials and a current is caused to flow through the serially connected materials and slab to achieve a cooling or chilling effect of such slab. The flow of such current may be controlled in accordance with the particular condition of the thermostat; and, indeed, in some circumstances the flow of current may be reversed through this assembly to change the junction between the P and N-type materials from a cold source to a heat source and vice versa.

It is therefore an object of the present invention to provide improved thermostat means incorporating one or more of the features indicated above.

A specific object of the present invention is to provide an improved thermostat which includes a cold source influencing the operation of the thermostat and system controlled thereby.

Another specific object of the present invention is to provide an improved thermostat which incorporates a cold source for providing an anticipatory effect such that, for example, the action of the thermostat in heat relationship to the cold source may be quickened to anticipate a particular condition of the system controlled by the thermostat.

Another specific object of the present invention is to provide an improved thermostat in which novel means are provided to render the action of the thermostat relatively insensitive to heat developed as a result of current flow through its switch contacts, particularly the heat developed when there is arcing between the contacts.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 4:
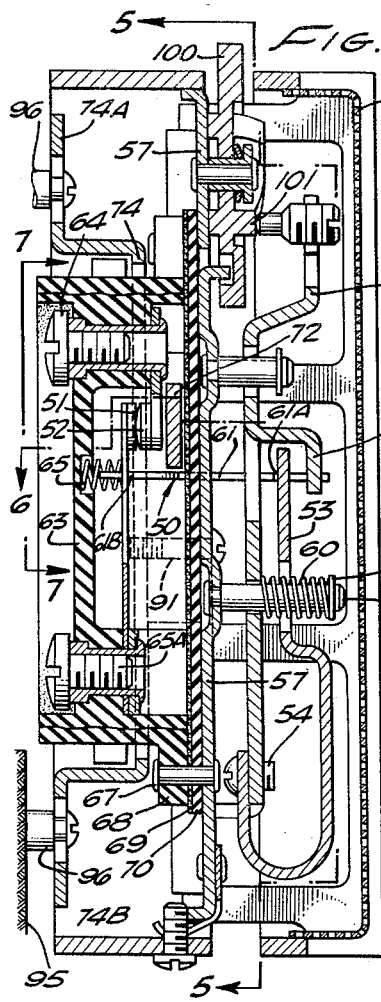
FIGURE 4 illustrates a cross-sectional view through a thermostat which also embodies other features of the invention.
Figure 5:
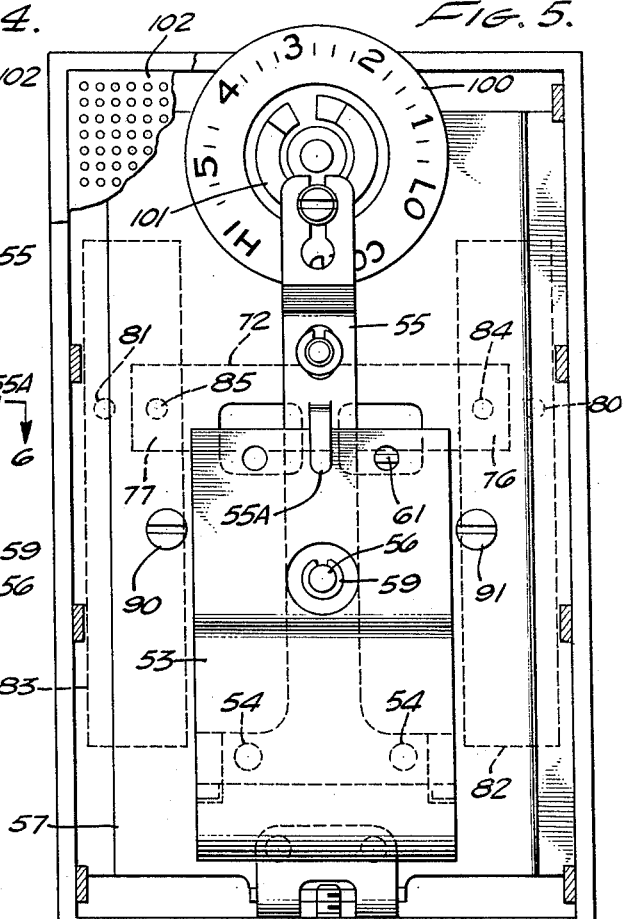
FIGURE 5 illustrates a view in front elevation of the thermostat shown in FIGURE 4 with the cover broken away and corresponds generally to a view taken on line 5—5 of FIGURE 4.
Figure 6:
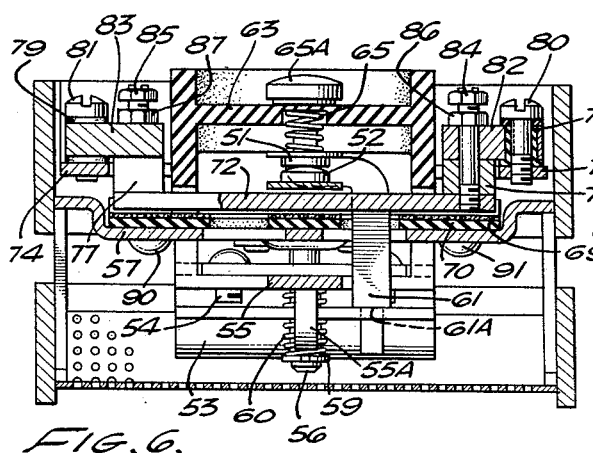
Figure 7:
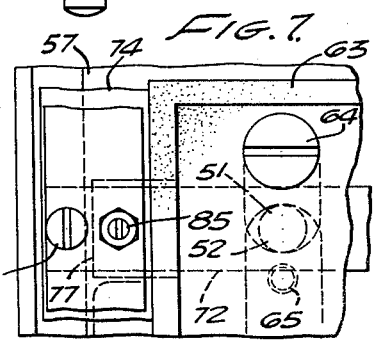

FIGURES 6 and 7 are sectional views taken on corresponding lines 6—6 and 7—7 in FIGURE 4.

Figures 1, 2, 3:
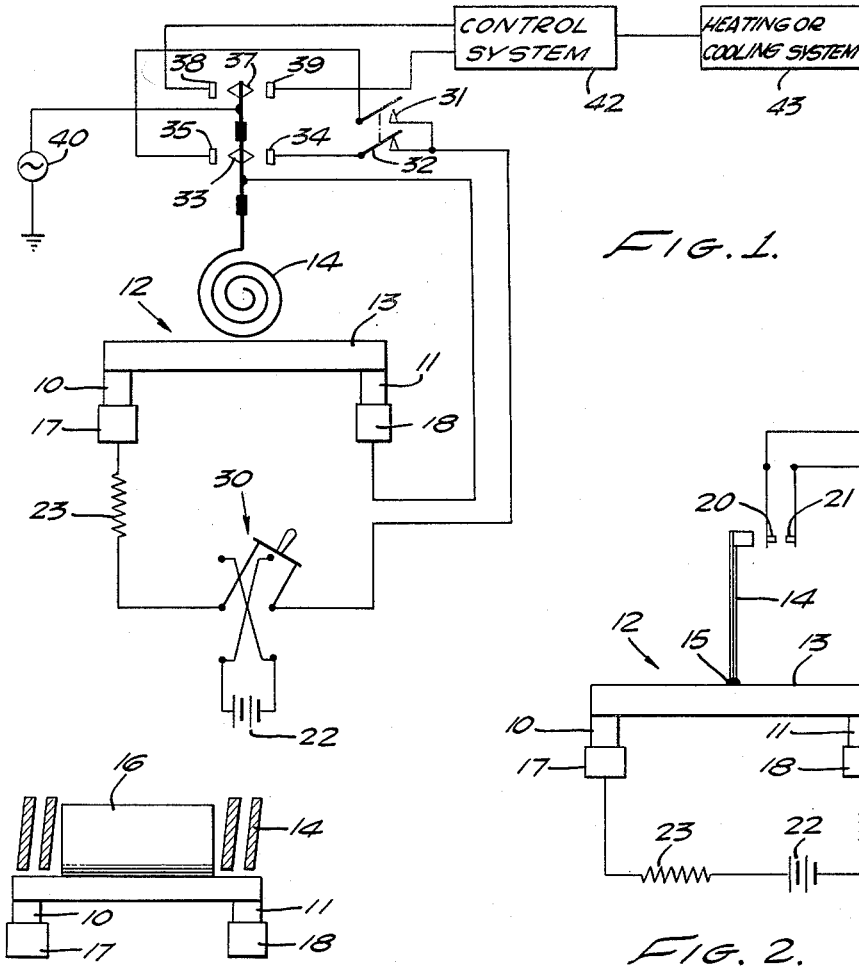
FIGURE 1 illustrates generally a form of junction which is incorporated in the various thermostat arrangements described herein and which is illustrated in a generalized system for accomplishing either a cooling or heating effect dependent upon the positions of the switches shown therein.
FIGURE 2 is a modification illustrating heat conduction between the thermostat and the junction.
FIGURE 3 illustrates another modification.

In the generalized system illustrated in FIGURE 1 there is provided a junction comprising a rectangular semiconductor 10 of lead telluride (N-type material), a rectangular semiconductor 11 of antimony telluride (P-type material) which form two legs of the junction 12. After properly tinning, these semiconductors are electrically and mechanically bonded to one side of the copper plate or slab 13 to join these two legs 10, 11. The other side of the metal plate 13 may be secured as, for example, by riveting or the like to the thermostat element 14 as illustrated at 15 in FIGURE 2 to provide a heat-conductive path thereto or, as shown in FIGURE 1, may simply be in proximity thereto for heat convection and heat radiation therebetween.

In some cases, as illustrated in FIGURE 3, the plate 13 may be in the form of a cylindrical plug 16 which is disposed within the confines of the circularly wound bimetal thermostat element 14 with or without a heat-conductive connection therebetween.

The legs 10 and 11 are also in heat-conductive relationship with metallic members 17 and 18 respectively which serve as heat sinks or heat dissipating means and in some cases may also comprise a part of an electrical series circuit as now described in connection with FIGURES 1 and 2.

It will be observed that the basic circuits in FIGURES 1 and 2 are the same and for purposes of simplicity the circuit shown in FIGURE 2 is described with the understanding that identical reference numerals in these two figures are used on the same elements.

The bimetal thermostat elements 14 closes the switch contacts 20, 21 upon attainment of a condition in, for example, a room air-conditioned or cooled in accordance with conditions in the room sensed by the thermostat 14. This switch 20, 21 is connected in series with the D.C. voltage source 22, a resistance 23 and the elements 17, 10, 13, 11 and 18 in that order to cause a D.C. current to flow through the junction 12 to produce a cooling or chilling effect on the thermostat 13. It will be understood that other apparatus is controlled by this same bimetal element 14 as indicated in FIGURE 1 to change this condition corresponding to the closed position of switch 20, 21. For purposes of anticipating such change, the bimetal element 14 is cooled artificially by the cold or chilling effect produced by junction 12.

This anticipatory effect produced artificially is like and is for the same general purposes as that produced by well known heat anticipators associated with thermostats. Briefly such heat anticipators provide a supplementary source of heat independent of environmental conditions in the room to allow the heat-producing apparatus to function for a shorter period of time so that the room temperature is maintained by the thermostat within closer limits than would otherwise be the case if there were no heat anticipator.

The cooling effect produced by the junction 12 in FIGURE 2 is dependent upon the direction of current flow therethrough; and upon reversing the direction of such current flow an opposite effect is accomplished, namely the junction then serves as a heat source for heating the thermostat. A generalized system for achieving these two effects, i.e. a cold and a hot effect, is illustrated in FIGURE 1.

For this purpose the voltage source 22 is connected through a conventional reversing switch 30 to change the direction of D.C. current flow through junction 12. Also, as shown, there is provided two mechanically interlocked switches 31 and 32 for selecting either thermostat switch comprising contacts 33 and 34 or thermostat switch comprising contacts 33 and 35, depending on the position of reversing switch 30.

The thermostat 14 also operates another single pole double throw switch 37, 38, 39 insulated from the previously mentioned single pole double throw switch 33, 34, 35.

The switch contact 37 is connected to a terminal of A.C. source 40 having its other terminal grounded. The other switch terminals 38 and 39 are connected to a conventional control system 42 for operating either the heating or cooling system 43 which serves to either heat or cool the particular environment to which thermostat 14 is subjected, the thermostat 14 serving to control the temperature of such environment, for example a room, within close limits.

For purposes of definition, contacts 34 and 39 are referred to as "cold" contacts in that they are contacted by the corresponding movable switch elements 33 and 37 when the system "calls for" coldness to be supplied to the environment which means that at this time the system 43 functions to supply cold air to the environment, i.e. the room; and also a current flows through the junction 12 to produce an artificial cooling of thermostat 14, i.e. to produce an anticipatory effect. Such current through the junction 12 at this time flows through a path which includes: switch 33, 34; switch 32; one leg of reversing switch 30; D.C. source 22; a second leg of reversing switch 30; resistance 23; and elements 17, 10, 13, 11 and 18 in that order. It will be noted that in this case switch 33, 34 in FIGURE 1 corresponds to switch 20, 21 in FIGURE 2.

The switch contacts 35 and 38 are referred to as the "hot contacts" and are engaged by their corresponding movable switch arms 33 and 37 when the system functions as a heating system and the same "calls for" heat to be supplied to the environment. In this mode of operation selecting switch 31 is closed, selecting switch 32 is opened and reversing switch 30 is in its other closed position. In this case the system 43 supplies heat to the environment and the junction 12 serves as a heat source for anticipatory purposes. The current flow through the junction 13 in the reverse direction in a path which includes: switch 33, 35; switch 31; a third leg of reversing switch 30; D.C. source 22; a fourth leg of switch 30; resistance 23 and elements 17, 10, 13, 11 and 18 in that order.

The junction previously described may also be used with a thermostat for achieving a closer regulation of the condition being monitored by providing a compensatory effect.

Thus, as now described in connection with FIGURES 4–7, the cold-producing junction 50 is located adjacent current-carrying and arcing contacts of the thermostat switch 51, 52 and preferably between such switch and its associated bimetal actuating element to render the operation of the bimetal 53 substantially independent of the heat produced by current flowing in the switch.

The bimetal element 53 is in the form of a U-shaped plate fastened by machine screws 54 on a loosely mounted adjustable supporting arm 55 which may pivot about the axis of pin 56, the pin 56 having its inner end riveted to the supporting plate 57 and its outer end provided with a split spring-retaining washer 59 which serves to retain the pre-stressed coil-compression spring 60 between such washer and the lever 55 to thereby floatingly mount the lever 55 and bimetal 53 on the supporting frame 57.

This lever 55 has a tongue member 55A formed therefrom which serves as a stop member for the upper end of bimetal 53, such upper end of the bimetal being also engageable in its reverse movement with the shouldered portion 61A of the switch-actuating push rod 61.

This push rod 61 suitably guided in the switch housing 63 of insulating material has a shouldered portion 61B engageable with the movable cantilever-supported switch contact 51 and extends therethrough into the prestressed coil-compression spring 65 which is recessed in the housing 63 and bears against the switch contact 51 to normally maintain switch 51, 52 closed as shown. The other stationary switch contact 52 is mounted on housing 63 and connected to terminal 64. The other switch terminal 65 connected to contact 51 mechanically supports the same as a cantilever. This composite switch is supported on the supporting plate 57 by rivets 67 which pass through a flanged portion 68 of the switch housing, a layer 69 of insulating gasket material, insulating plate 70 and support 57.

As shown in FIGURE 6, the cold junction bar 72 is mounted adjacent the stationary switch contact 52 by a construction now described involving the supporting member 74 which is insulated electrically from the lead telluride semiconductor 76 and antimony telluride semiconductor 77 by insulating bushings 78 and 79 respectively, through which corresponding fastening screws 80 and 81 pass. These screws 80 and 81 serve to insulatedly fasten the heat sink or heat radiating elements 82 and 83 to the supporting member 74.

The terminals for the cold junction are in the form of threaded screws 84 and 85 which have nuts 86 and 87 thereon to electrically and mechanically clamp together the elements of the cold junction.

A cold junction supporting plate 74 is suitably secured to the switch housing by screws 90 and 91. It is noted that this supporting member 74 also has upper and lower bent portions 74A and 74B with apertured portions therein for mounting the composite thermostat on a flat surface such as a wall of a room.

It is also noted that the heat sink or radiating members 82 and 83 are elongated rectangular bars, insulated electrically from each other to provide a large extended radiating area. In order to assure free flow of air to the heat sink elements 82 and 83, the thermostat is preferably mounted so as to be spaced from the supporting wall 95 by spacers 96.

Conventional means may be used to adjust the temperature at which the bimetal 53 opens the switch 51, 52. Such means may comprise a manually adjustable wheel 100 having a cammed surface 101 thereon contacting an adjustable set screw on the upper end of the spring-biased and floating bimetal supporting plate 55, the wheel 100 being rotatably mounted on supporting member 57. A front cover 102 of perforated material is suitably fastened to the supporting member 57.

It will thus be appreciated that the cold junction may be positioned in the thermostat to produce not only an anticipatory effect but also a compensatory effect.

While in the arrangements shown in FIGURES 1–3 the junction is energized to produce a cold condition upon closing of the thermostat switch, a small continuous D.C. current independent of operation of the thermostat switch may flow through the junction to produce a compensatory effect for the heat developed by current flowing through the switch. This particular modification is illustrated in FIGURE 2 wherein is shown a dotted connection includes a resistance 104 through which a small continuous current flows for achieving this compensatory effect.

While the drawings show the semi-conductive materials as being generally rectangular, it will be appreciated that actually they are in the form of rounded pellets. Further, it will be understood that the semi-conductive materials may be of different materials than that specified. As additional examples such materials comprising a pair of junctions may be of the following: bismuth telluride, bismuth; bismuth antimony, bismuth antimony telluride; lead telluride, bismuth telluride.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A control system of the character described comprising a single-pole double-throw switch having a movable contact and two stationary contacts selectively engageable therewith; a heat-responsive means for moving said contact into selective engagement with said stationary contacts; an element in heat relationship to said means for influencing the operation of the same; said element having two end portions, one of said end portions being in heat-conductive relationship with a P-type material, the other one of said end portions being in heat-conductive relationship with an N-type material; a first heat sink in heat-conductive relationship to said N-type material; a second heat sink in heat-conductive relationship with said P-type material; said first and second heat sinks conveying heat produced by said switch away from said element; a first switch for connecting said element in a first series circuit with said first series circuit comprising: said first switch, one of said stationary contacts, said movable contact, said P-type material, said element and said N-type material; a second switch for connecting said element in a second series circuit with said second series circuit comprising: said second switch, the other one of said stationary contacts, said movable contact, said P-type material, said element and said N-type material; means rendering said first and second switches alternately effective to complete said first and second series circuits; a source of unidirectional voltage having a pair of terminals; and two-position reversing switching means for alternately connecting said terminals in said first and second series to produce current flow in opposite directions through said element corresponding to the position of said reversing switching means.

2. A thermostat comprising an element responsive to heat, a cold junction mounted adjacent said thermostat and influencing the operation of said heat-responsive element, a heat sink in heat conductive relationship to said cold junction, said thermostat including a switch operated by said heat-responsive element, said switch being heated by current flowing therethrough, said cold junction being mounted in proximity to said switch in an intermediate position between said switch and said heat-responsive element to produce a cooling effect which compensates for the heating effect produced by the switch on said heat-responsive element.

References Cited in the file of this patent

UNITED STATES PATENTS

| | | |
|---|---|---|
| 1,656,949 | Miller | Jan. 24, 1928 |
| 1,919,330 | Hornung | July 25, 1933 |
| 2,896,005 | Fritts | July 21, 1959 |
| 2,921,973 | Heikes | Jan. 19, 1960 |
| 2,936,125 | Leins | May 10, 1960 |
| 2,963,531 | Seegert | Dec. 6, 1960 |
| 2,981,774 | Matthews | Apr. 25, 1961 |